3,027,401
PRODUCTION OF ESTERS OF β-PROPIONYL-
ACRYLIC ACID
Franz Reicheneder, Karl Dury, Hubert Suter, and Carl-Heinz Willersinn, Ludwigshafen (Rhine), Germany, assignors to Badische Anilin- & Soda-Fabrik Aktiengesellschaft, Ludwigshafen (Rhine), Germany
No Drawing. Filed Mar. 24, 1959, Ser. No. 802,594
Claims priority, application Germany Mar. 28, 1958
5 Claims. (Cl. 260—483)

This invention relates to the production of esters of β-propionyl-acrylic acid.

It has heretofore already been known that gamma-lactones can be converted into the open-chain esters by alcoholysis under re-esterification conditions. A disadvantage of the alcoholytic cleavage, however, is the fact that the acids used as catalysts, for example hydrochloric acid or sulfuric acid, add on to the double linkage in side reactions so that the yield of pure esters is diminished. Furthermore the esters contaminated with the addition products have to be purified separately.

We have now found and this is the object of our invention that esters of β-propionylacrylic acid (I) are obtained in a simple and efficient manner by reacting methylprotoanemonin (II) with the corresponding alcohol at normal or elevated temperature using an acid ion-exchanger as catalyst. Methylprotoanemonin can be produced in the manner disclosed by H. M. Walton in "Journal Organic Chemistry," vol. 22, p. 312.

The particular object of this invention is to produce the said esters by alcoholysis in the manner illustrated by the following reaction scheme:

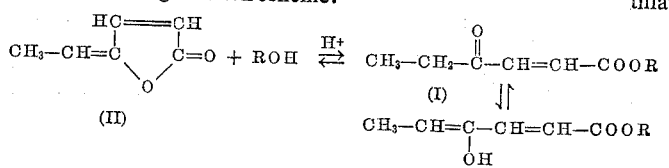

In the practice of our invention as illustrated by the foregoing equation, methylprotoanemonin is converted into the open unsaturated ester, for example by leading a solution of methylprotoanemonin in an excess of alcohol through a reaction zone packed with an acid ion-exchange compound. Preferred alcohols for the esterification are primary and secondary saturated aliphatic alcohols with 1 to 4 carbon atoms, for example methanol, ethanol, propanol and butanol, or also secondary alcohols, as for example isopropanol or secondary butanol. Cycloaliphatic alcohols, as for example cyclohexanol and cyclo-octanol, aryl-substituted alcohols, such as benzyl alcohol, phenyl ethyl alcohol and the like as well as tertiary alcohols and monoglycol ethers, as for example ethylene glycol monoethyl ether, may also be used for the alcoholytic esterification of the unsaturated lactone ring. Polyhydric alcohols, as for example glycol, can also be used for this reaction.

All known commercial ion-exchange compounds having acid groups, i.e. SO₃H and COOH groups, can be used as catalysts, those bearing free —SO₃H groups being preferred. Good results are obtained by using acid ion-exchangers of the synthetic resin type, especially sulfurized polystyrenes.

In the usual case the reaction is carried out at a temperature which is about 10° C. below the boiling point of the particular alcohol used. It may also be good practice, however, to carry out the re-esterification with low boiling alcohols at higher temperatures. In this case the reaction temperature can be raised by operating under pressure. The temperature range within which the reaction is normally carried out is from 15° C. to 120° C., more specifically from 50° C. to 90° C., the pressure being normal or moderately increased, for example 1 to 50 atmospheres. When increased pressure is applied the temperature can also be raised up to about 10° C. below the boiling point which corresponds to the pressure applied.

The mol ratio of methylprotoanemonin to alcohol may vary from 1:5 to about 1:50.

The process can be carried out discontinuously or continuously. When working continuously, the reaction solution may be pumped into the bottom of a vertical tube and led through the reaction zone. The reaction zone is advantageously heated externally by a liquid. It is possible however to adopt the trickling method and to allow the reaction solution to flow downwardly over the ion-exchanger. In the discontinuous method, the ion-exchanger may be introduced in the most finely divided form possible into the reaction solution and kept in constant movement by vigorous stirring. The ion-exchanger used for the alcoholytic cleavage of the methylprotoanemonin must be free from water. The same is true of the other reactants.

In the discontinuous method, the esterification may be carried out by boiling under reflux with the particular alcohol employed. It is possible to work under pressure and thereby to raise the temperature. The reaction may also be carried out in a closed vessel, for example an autoclave, in which pressure is set up by heating the vessel.

The reaction mixture is worked up by fractional distillation. The excess alcohol is distilled off and the ester is then purified by simple distillation, if necessary in vacuo.

A special advantage of the process according to this invention is that the reaction products are directly obtained in very pure form and by reason of the ion-exchangers used do not contain catalyst residues. This is especially of importance when the esters obtained are used as pharmaceuticals or intermediates for pharmaceuticals.

The following examples will further illustrate this invention but the invention is not restricted to these examples. The parts specified, unless otherwise stated, are parts by weight.

*Example 1*

600 parts by volume of an acid ion-exchanger is rigidly arranged in a vertical tube. The reaction tube is heated to 72° C. by a heating liquid. A reaction solution of 110 parts of methylprotoanemonin and 1,010 parts of absolute ethanol is led through the tube in the course of 10 hours. The mol ratio is 1:22. The liquid is collected in a separating and cooling system at the upper end of the tube. By fractional distillation of the crude reaction product the excess quantity of absolute alcohol is recovered and refed into the reaction. Then at a boiling point of 95° C. to 105° C. at 20 mm. Hg β-propionylacrylic acid ethyl ester having the refractive index $n\ 20/D = 1.4450$ to $1.4515$ is obtained.

The yield of ethyl β-propionylacrylate is 145 parts, or 93% of the theory with reference to the methylprotoanemonin introduced.

Example 2

Using the same conditions as in Example 1, the reaction temperature can be raised to 90° C. to 95° C. by heating the reaction zone with steam. In this case a reflux condenser is built into the separating and cooling system at the upper end of the reaction tube. A reaction solution of 110 parts of methylprotoanemonin and 505 parts of absolute ethanol (mol ratio 1:11) is led through the tube in the course of 4 hours and after the end of the reaction the tube is flushed twice, each time with 150 parts of pure absolute ethanol. The product is worked up as in Example 1.

140 parts of ethyl β-propionylacrylate is obtained, that is 89.5% of the theory with reference to the amount of methylprotoanemonin used.

Example 3

Using the same apparatus as in Example 1, 110 parts of methylprotoanemonin and 1,010 parts of absolute ethanol (mol ratio 1:22) are introduced at the top of the reaction tube in the course of 8 hours. The reaction temperature is 80° C. to 70° C. At the lower end of the tube, the ethyl β-propionylacrylate is collected and worked up as described in Example 1. 142.5 parts of ethyl β-propionylacrylate is obtained, that is, 92% of the theory with reference to the amount of methylprotoanemonin used.

Example 4

200 parts by volume of an acid ion-exchanger is kept in vigorous movement in a reaction solution consisting of 37 parts of methylprotoanemonin and 460 parts of absolute ethanol in a stirring vessel (mol ratio 1:30). After boiling the reaction solution under reflux for 5 hours, the ion-exchanger is filtered off and washed twice, each time with 50 parts of absolute ethanol. From the washing liquid and the filtrate there is recovered, as described in Example 1, 50 parts of ethyl β-propionylacrylate, that is, 95% of the theory with reference to the amount of methyl-protoanemonin used.

We claim:

1. A process for the production of esters of β-propionylacrylic acid which comprises reacting an excess of an alcohol selected from the group consisting of primary and secondary saturated aliphatic alcohols with 1 to 4 carbon atoms, cyclohexanol, cyclo-octanol, benzyl alcohol, phenyl ethyl alcohol and glycol with methylprotoanemonin having the formula

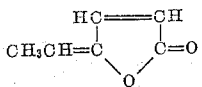

in the presence of an acid ion-exchanger as a catalyst.

2. The process as claimed in claim 1 wherein methylprotoanemonin is reacted with an alcohol selected from the group consisting of primary and secondary saturated aliphatic alcohols with 1 to 4 carbon atoms.

3. The process as claimed in claim 2 wherein an ion-exchanger with free —SO$_3$H groups is used as a catalyst.

4. A process for the production of esters of β-propionylacrylic acid which comprises reacting methylprotoanemonin having the formula $$\begin{array}{c} HC=\!=\!=CH \\ | \quad\quad | \\ CH_3-CH=C \quad C=O \\ \diagdown\!\!\diagup \\ O \end{array}$$

with an excess of from 1:5 to 1:50 mols of an alcohol selected from the group consisting of primary and secondary saturated aliphatic alcohols with 1 to 4 carbon atoms, in the presence of an acid ion-exchanger with free —SO$_3$H groups as a catalyst at normal pressure and at a temperature from 15° C. to 120° C.

5. A process as claimed in claim 4 wherein the alcohol is ethanol.

References Cited in the file of this patent

UNITED STATES PATENTS 2,532,579    Thomas ---------------- Dec. 5, 1950

OTHER REFERENCES

Sussman: Ind. Eng. Chem. 38, 1228–1230 (1946).
Kipping: J. Chem. Soc. (London), 1935, 1145–1147.
Moffatt et al.: J. Chem. Soc. (London), 1946, 451–454.
Rodd: "Chemistry of Carbon Compounds," vol. 1, part B, 1952, pp. 798–799.

UNITED STATES PATENT OFFICE
CERTIFICATE OF CORRECTION

Patent No. 3,027,401 March 27, 1962

Franz Reicheneder et al.

It is hereby certified that error appears in the above numbered patent requiring correction and that the said Letters Patent should read as corrected below.

Column 3, line 23, for "80° C." read -- 68° C. --.

Signed and sealed this 11th day of September 1962.

(SEAL)
Attest:

ERNEST W. SWIDER
Attesting Officer

DAVID L. LADD
Commissioner of Patents